Patented Oct. 20, 1925.

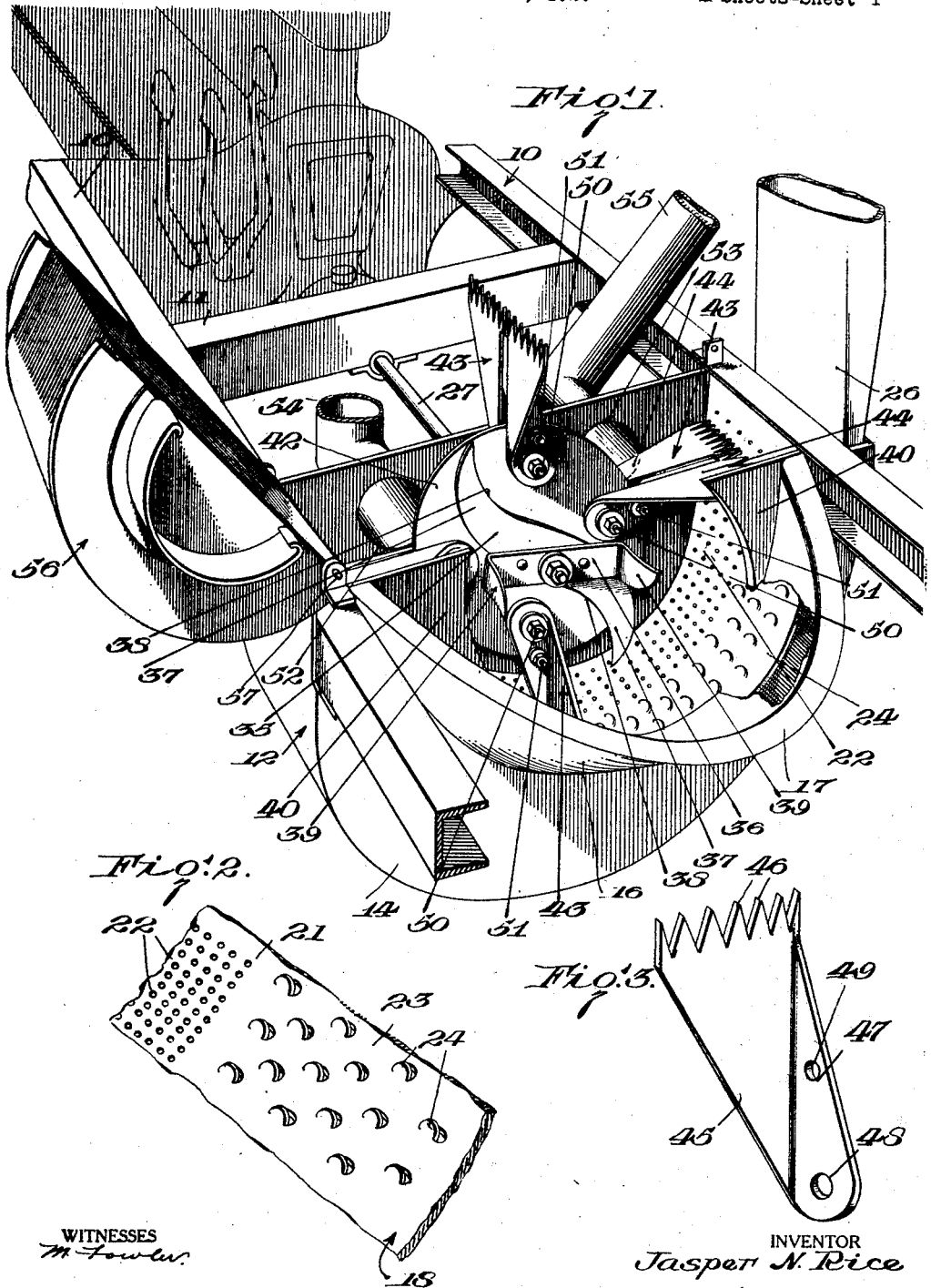

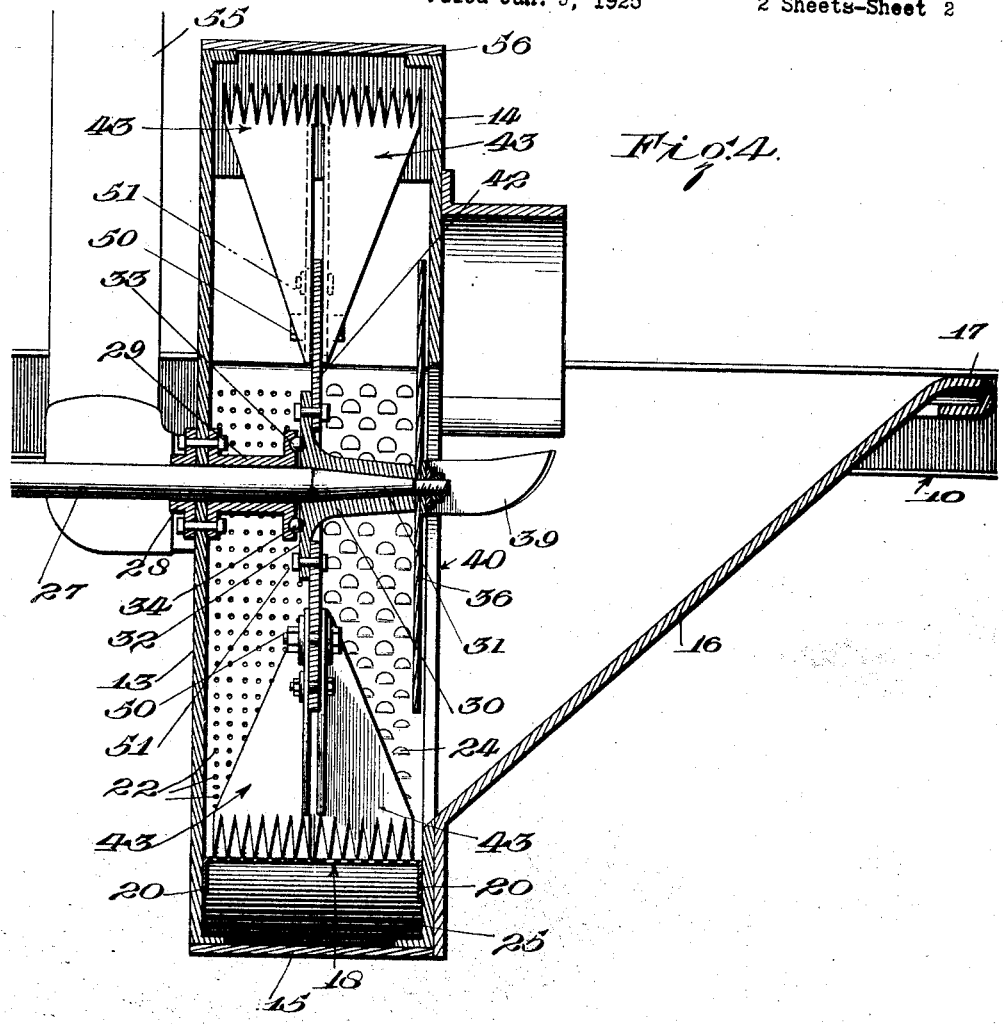

1,558,394

UNITED STATES PATENT OFFICE.

JASPER N. RICE, OF ST. JOSEPH, MISSOURI.

APPARATUS FOR GRINDING FODDER, STRAW, OR SIMILAR ROUGH FOOD FOR STOCK.

Application filed January 5, 1925. Serial No. 612.

*To all whom it may concern:*

Be it known that I, JASPER N. RICE, a citizen of the United States, and a resident of St. Joseph, in the county of Buchanan and State of Missouri, have made certain new and useful Improvements in Apparatus for Grinding Fodder, Straw, or Similar Rough Food for Stock, of which the following is a specification.

This invention relates to an apparatus for grinding fodder, straw, or similar rough food for stock.

An object of the invention is to provide an apparatus of the above character which may be mounted upon the chassis of a motor vehicle and driven from the propelling power for the motor vehicle.

It is also an object of the invention that the apparatus operate to grind and pulverize fodder or the like in a uniform and rapid manner.

It is also within the scope of the objects of the invention that the apparatus be durable in construction, and comparatively inexpensive to manufacture.

Other objects, and objects relating to details of construction, combination and arrangement of parts will hereinafter appear in the detail description to follow.

The invention is illustrated by way of example in the accompanying drawings, in which:—

Figure 1 is a perspective view showing the present apparatus applied to a motor vehicle chassis, Figure 2 is a fragmentary view showing in detail the construction of the false bottom of the enclosure or drum employed, Figure 3 is a detail perspective view of one of the combined grinder and blower blades employed in the construction of the apparatus, and, Figure 4 is a transverse sectional view through the grinding apparatus shown in Figure 1.

Referring to the drawings more particularly, in Figure 1, 10 indicates the side frame members of a motor vehicle chassis and 11 a cross frame member of said chassis. In constructing the grinding apparatus a drum 12 is provided which comprises a front wall 13, a rear wall 14, and an intermediate or connecting wall 15. Preferably the wall 15 is riveted or similarly secured to walls 13 and 14 as shown to advantage in Figure 4. The wall 13 is arranged so that its upper end extends between the frame members 10 of the motor vehicle chassis. The front wall 14 is formed with a rearwardly protruding lip 16 preferably of the curvature shown and said lip has its upper edge formed with a bead 17.

The interior of the drum 12 is divided by a false bottom 18 which is semi-circular in shape, and each longitudinal edge thereof is provided with a downwardly extending flange 20, and said flanges are employed for securing the false bottom within the drum. The portion 21 of the false bottom 18 is perforated as at 22, Figures 1 and 3, while the portion 23 thereof has a multiplicity of projections or tangs 24 struck upwardly therefrom. It should be noted that the projections or tangs 24 are uniform in size and all extend in one direction. The division wall 18 forms a receiving chamber 25 and this chamber communicates with a discharge or outlet pipe 26.

When mounting the present apparatus upon the chassis of a motor vehicle, the drive shaft of the motor vehicle is removed and a short drive shaft substituted as shown at 27. As shown in Figure 4, the wall 13 of drum 12 may carry a pair of bearing sleeves 28 and 29 to properly journal the rear end of shaft 27. The shaft 27 terminates at its last named end in a tapered portion 30 upon which there is keyed or otherwise secured a hub 31 which is formed at its forward end with a flange 32; and between flange 32 and a flange 33, formed upon the rear end of the bearing sleeve, ball bearings 34 are suitably arranged.

The shaft 27 projects from the rear end of hub 31 and this projecting portion of the shaft has bolted thereon a cutter blade 35 and a feed-hook 36. The cutter blade is so constructed that each end thereof terminates in an arcuate portion 37 and the inner edge 38 of each portion serves as a cutting edge. The feed-hook 36 is in the form of an elongated plate as shown and each end terminating in a laterally extending curve portion 39 which tapers to a point at its outer end. The blade 35 moves in close relation to the wings 40, and the portions 39 of the feed-hook 36 move between the inner edges of the wings 40 and extend rearwardly therefrom whereby upon any fodder or the like being deposited upon the receiving lip 16 the same will be engaged by the member 37 and drawn toward and into the path of the cutter 35.

A disk 42 is bolted to the flange 32 and this disk carries a plurality of combined blower and grinding blades 43. The blades 43 are preferably four in number as shown, and each blade is made into two sections 44. As best shown in Figure 3 each section 44 comprises a plate 45 terminating at its one end in saw teeth 46, and formed along one longitudinal edge with a securing flange 47. Each flange 47 is formed with bolt-receiving openings 48 and 49 which may be brought to register with similar openings formed in the disk 42. Two bolts 50 and 51 are employed for securing each pair of sections 44 upon the disk 42. The bolt 50 in each instance is larger than the bolt 51 in order to permit bolt 51 to shear in case the blades 43 encounter an excessive retardation against rotative movement. The shaft 27 rotates in a clock-wise direction and it will be noted that the blades 43 curve slightly in the direction of rotation thereof. The teeth 46 of blade sections 44 bolted upon the rear face of disk 42 move in close relation to the tangs 24 and the teeth 46 of the blade sections bolted to the forward face of the disk 42 move in close relation to the perforated portion 21 of the false bottom 18.

The wall 13 is further provided with the openings 52 and 53. The opening 52 communicates with an inlet pipe 54 and the opening 53 communicates with a pipe 55. The purpose of the pipe 54 is to permit air to enter the drum 12 and the purpose of the pipe 55 is to permit screenings to be fed into the apparatus for regrinding.

There is further provided a hood 56 which is hinged as at 57, and said hood is constructed and designed to cooperate with the wings 40 and front wall 13 to substantially enclose the rotary blades 43 and cutter 35.

In the use of the present apparatus, the engine of the motor vehicle upon which the same is mounted may be employed for driving the blades 43, cutter 35 and feed-hook 36. Since the shaft 27 is directly connected to these elements, the same can be driven at a relatively high speed.

Fodder or the like may be deposited upon the lip 16 and the hook 36 will pull the same forwardly and into the path of cutter 35. Cutter 35 will sever the fodder into short sections and these short sections will be engaged by the teeth of the blades 43. The fodder will first be operated upon by the rearmost blade sections 44 and when the fodder is brought between the teeth 46 and tangs 24 the same will be finely ground and pulverized and forced through the openings in false bottom 18 beneath the tangs 24. The blades 43 will also cause a blowing action, due to their shape and disposal, and the air pressure so provided will aid in causing the ground fodder to pass through the openings in wall 18 beneath tangs 24. The forward blade sections 44 assist in grinding the fodder which may be brought between the teeth thereof and the wall 18. The perforations 22 will not permit any appreciable quantity of ground fodder to pass therethrough but considerable air can pass through said perforations and into the chamber 25 which will cause the ground fodder in said chamber to be forced through the discharge pipe 26. It is therefore seen that the blades 43 perform a twofold function, viz., the blades serve to grind the fodder and also serve to produce an air pressure sufficient to force the discharge pipe 26. The device is in fact a combined grinder and blower.

While I have shown and described the preferred construction of my device, I wish it to be understood that I am aware of the fact that the general construction, combination, and arrangement of parts might be changed by those skilled in the art without departure from the spirit of my invention as indicated by the appended claims.

While herein I have referred to my invention merely as an apparatus for grinding rough food for stock, it is to be understood that I intend it to be used for grinding any feed or other substance usually ground by feed mills, and roughness in addition. It will also be understood that while I have described the adaptation of the mill to an automobile chassis, the mill can be built so as to be run with a belt from any driven source of power and is not confined to its use in connection with the chassis.

I claim:

1. A grinding apparatus comprising a drum, a rotary element within the drum, radially extending blower blades carried by said rotary member, a perforated false bottom within the drum, and projections struck upwardly from the false bottom adapted to cooperate with the teeth of said blades for grinding and pulverizing material deposited within said drum, and said blades also developing air pressure to force the ground material through the perforated false bottom of the drum.

2. A grinding apparatus, comprising a drum having a receiving opening at its one end, a rotary member within the drum, blades carried by the rotary member adapted to cooperate with projections carried by interior walls of the drum for grinding and pulverizing material, a cutter blade carried by the rotary member adapted to operate upon material previous to said material being acted upon by said blades, and means also carried by the rotary member adapted to operate upon material deposited in said receiving opening and bring said material in the path of said cutter blade.

3. A grinding apparatus comprising a drum having a receiving opening at its one end, a rotary member within the drum, blades carried by the rotary member adapted to cooperate with projections carried by interior walls of the drum for grinding and pulverizing material, a cutter blade carried by the rotary member adapted to operate upon material previous to said material being acted upon by said blades, and a hook like member carried by the rotary member in the drum and adapted to engage material deposited within said receiving opening of the drum and draw the same into the path of said cutter blade.

4. A grinding apparatus comprising, a drum, rotary blower blades within the drum, teeth upon the outer ends of the blades, a false bottom within the drum adapted to provide a receiving chamber therebeneath and said chamber having a pipe outlet, and projections struck upwardly from the false bottom of the drum adapted to cooperate with the teeth of the blades for grinding and pulverizing material within the drum, said projections also providing openings within the false bottom to permit the pulverized material to pass into the chamber therebeneath and be blown from the outlet pipe.

5. A grinding apparatus, comprising a drum, rotary blower blades within the drum, teeth upon the outer ends of said blower blades, a false bottom within the drum adapted to provide a chamber therebeneath, said chamber having an outlet, projections struck upwardly from a portion of the false bottom, said projections providing openings in the bottom therebeneath and said projections being adapted to cooperate with the teeth upon the blades for grinding and pulverizing material deposited within the drum, and said openings provided by the projections permitting the ground material to pass into the chamber beneath the false bottom, said false bottom also having a perforated portion to permit the air currents developed by said blades to pass into the chamber beneath the false bottom and blow the ground material from said outlet.

6. In an apparatus of the character described, a drum, a rotary member within the drum, a plurality of feed grinding members carried by the rotary members, each grinding member being pivotally connected at its one end to the rotary member and extending radially therefrom, and a second connection between the rotary member and each grinding member adapted to hold the grinding members in operative position and also adapted to release the grinding members when subjected to a severe pressure.

7. In an apparatus of the character described, a drum, a rotary disk within the drum, a plurality of blades carried by the rotary member, each blade having an elongated slot at its inner end, adapted to receive the disk, means for pivoting the last named ends of the blades to the disks, and a second connection between the disk and each blade adapted to hold the blades in operative position and also adapted to release the blades when subjected to a high pressure.

JASPER N. RICE.